M. MURPHY.
HEATING COIL DISK.
APPLICATION FILED APR. 15, 1916.
1,234,196.
Patented July 24, 1917.
2 SHEETS—SHEET 1.
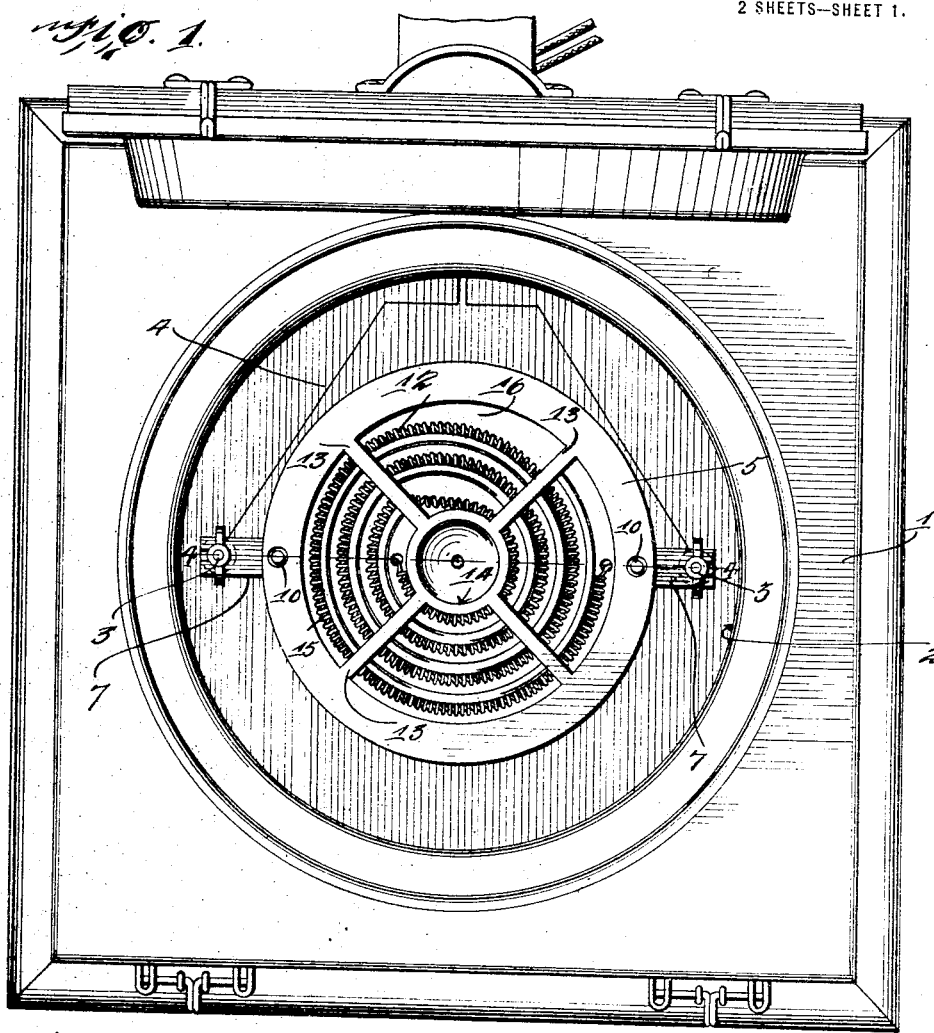
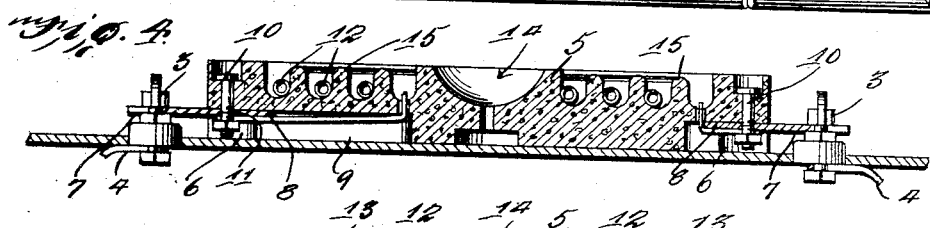
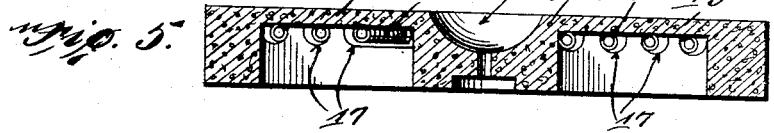
Inventor
Morton Murphy
By E. E. Vrooman & Co.,
his Attorneys M. MURPHY.
HEATING COIL DISK.
APPLICATION FILED APR. 15, 1916.
1,234,196.
Patented July 24, 1917.
2 SHEETS—SHEET 2.
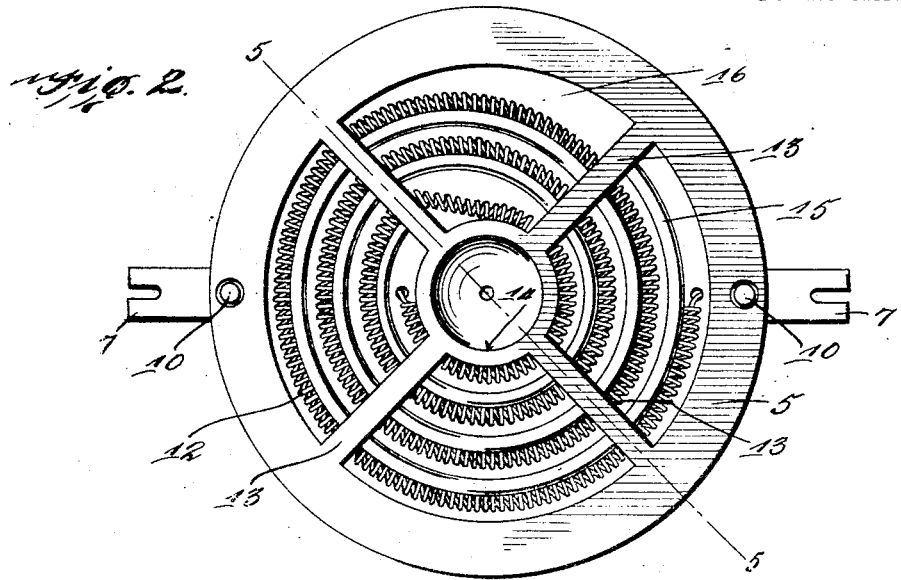
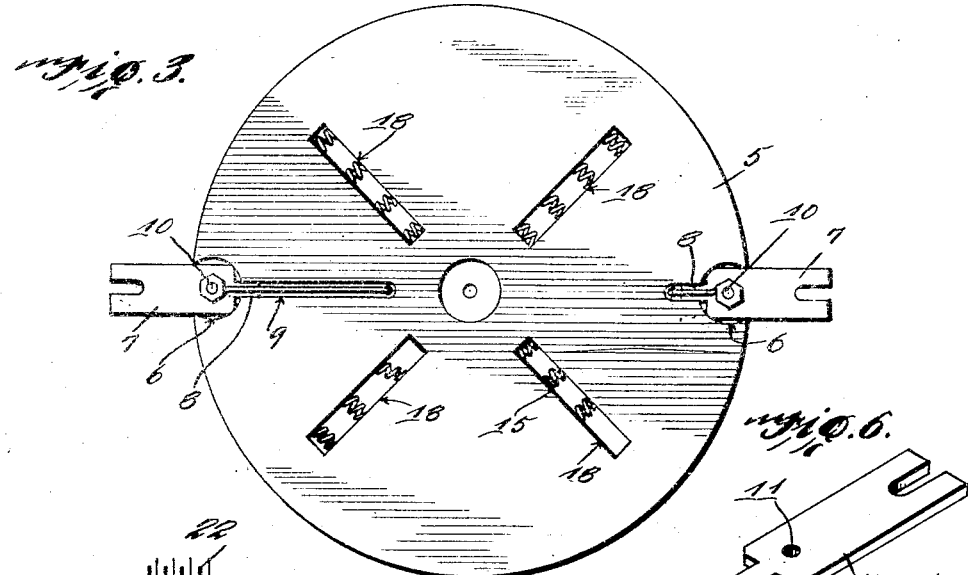
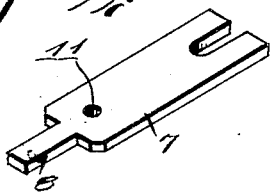
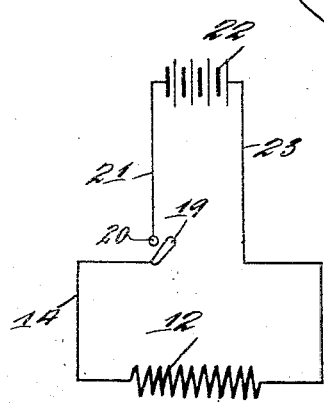
Inventor
Morton Murphy.
By *[signature]*
his Attorneys

UNITED STATES PATENT OFFICE.

MORTON MURPHY, OF JANESVILLE, WISCONSIN.

HEATING-COIL DISK.

1,234,196.  Specification of Letters Patent.  Patented July 24, 1917.

Application filed April 15, 1916. Serial No. 91,472.

*To all whom it may concern:*

Be it known that I, MORTON MURPHY, a citizen of the United States of America, residing at Janesville, in the county of Rock and State of Wisconsin, have invented certain new and useful Improvements in Heating-Coil Disks, of which the following is a specification, reference being had therein to the accompanying drawing.

This invention relates to heating coils for fireless cookers and the like, and has for its object the production of a simple and efficient means for heating the interior portion or well of a fireless cooker to a predetermined temperature.

Another object of this invention is the production of a simple and efficient means for supporting the heating coil within the bottom of the receptacle or well of the fireless cooker so as to efficiently heat the interior of the cooker.

A still further object of this invention is the production of a simple and efficient means for supporting the heating coil within the bottom of the receptacle or well of the fireless cooker so as to permit the heating coil or element to be readily removed for cleaning or replacement without the use of tools.

Other objects and advantages of the present invention will appear throughout the following specification and claims.

In the accompanying drawings:—

Figure 1 is a top plan view of the fireless cooker, the cover thereof being shown extending vertically.

Fig. 2 is a top plan view of the heating disk removed from the cooker.

Fig. 3 is a bottom plan view of the heating disk.

Fig. 4 is a section taken on line 4—4, of Fig. 1.

Fig. 5 is a section taken on line 5—5, of Fig. 2.

Fig. 6 is a detail perspective of one of the contact plates.

Fig. 7 is a diagrammatic view showing the electrical circuits involved in connection with the present invention.

By referring to the drawings it will be seen that 1 designates the body of the fireless cooker which is provided with the usual well 2. A plurality of contact posts 3 are placed within the well, and these contact posts 3 are electrically connected to a source of electrical supply by means of the conducting wires 4 as will be described in the following specification.

A heating disk 5 which is preferably formed circular to conform to the shape of the inner portion of the well is mounted within the well 2 of the fireless cooker, and this heating disk 5 is preferably formed of porcelain or any other suitable non-conducting material. The disk 5 is provided upon the under face thereof with notches 6 near the periphery thereof, within which notches 6 are seated the contact plates 7, these plates 7 being formed of conducting material. The plates 7 are provided with projecting fingers 8, which fingers 8 fit in the slots 9 formed in the bottom of the disk 5 and constitute an efficient means for holding the contact plates 7 against twisting movement. Bolts 10 pass through the disk 5 and also through the apertures 11 formed in the contact plates 7 so as to constitute an efficient means for connecting the terminals of the heating coil 12 to the contact plates 7, and also means for holding the contact plates in engagement with the disk 5. The disk 5 is provided with a plurality of rib portions 13, which rib portions 13 are arranged so as to radiate from the central cup portion 14 of the disk and constitute a reinforcement for the disk 5 and also a support for a receptacle which may be placed upon the disk. A spirally arranged rib 15 extends around the upper face of the disk 5 within the segmental pockets 16 formed in the upper face of the disk, and the ribs 13 are provided with notches 17 upon the lower face thereof, through which notches 17 passes the heating coil 12, the heating coil 12 being connected at its opposite ends to the terminal or contact plates 7.

The disk 5 is provided with a plurality of notches 18 upon the lower face thereof, preferably below the rib portions 13 as illustrated clearly in Fig. 3 of the drawing.

As shown in Fig. 7 illustrating the electrical connections in connection with the present invention, it will be seen that the coil 12 is connected to the feeding wires 14, one of which wires is connected to the automatic switch 19, and the other wire being connected to the contact battery 22. A wire 21 is also connected to the contact point 20, and is connected at one end of the battery 22 or other suitable source of electrical supply which may be substituted therefor. A return wire 23 is connected to the battery or source of electrical supply 22, and is in turn connected to the heating coil 12. It will be seen that it is necessary, of course, to close the contact or circuit breaker 19 in order that current may be passed through the heating coil 12, and that when the switch 19 is opened, the current will be shut off from the heating coil 12.

The construction of the shut-off referred to is disclosed clearly in my co-pending application entitled "An automatic cut-off for fireless cookers".

From the foregoing description it will be seen that owing to the fact that the contact plates which are carried by the heating disk are held in engagement with the contact bolts by means of thumb screws, the heating disk may be readily removed from the heating well for cleaning or replacement without the necessity of employing tools or complicated adjustments in order to replace a new disk for the old one or in order to clean the same.

Having thus described the invention what is claimed as new, is:—

1. As a new article of manufacture, a heating disk for an electrical fireless cooker comprising a body formed of non-conducting material, contact plates connected to said disk, said disk provided with radiating ribs flush with the upper face of said disk, said disk also provided with sunken pockets below the upper face of said disk, said radiating ribs constituting a support for a receptacle adapted to be placed thereon, a heating coil extending spirally around said body, said ribs formed upon said disk and provided with notches upon the under face thereof for permitting the passage of said coil under said ribs, and a spirally wound rib extending through said pockets and constituting a protector for said heating coil.

2. As a new article of manufacture, a heating disk for an electric fireless cooker comprising a body formed of non-conducting material, contact plates connected to said disk, said disk provided with radiating arms flush with the upper face of said disk, said disk also provided with sunken pockets below the upper face of the disk, said radiating arms constituting a support for a receptacle adapted to be placed thereon, a heating coil positioned upon said body and mounted within said pockets and passing through said radiating arms, and a spirally wound rib extending through said pockets and constituting a protector for said heating coil.

In testimony whereof I hereunto affix my signature.

MORTON MURPHY.